United States Patent [19]

Kuno

[11] Patent Number: 5,330,770

[45] Date of Patent: Jul. 19, 1994

[54] WATER-SOLUBLE GLASS WATER-TREATING AGENT

[75] Inventor: Toyohiko Kuno, Uji, Japan

[73] Assignee: Kinki Pipe Giken Kabushiki Kaisha, Kyoto, Japan

[21] Appl. No.: 50,839

[22] Filed: Apr. 21, 1993

Related U.S. Application Data

[63] Continuation-in-part of Ser. No. 725,902, Jul. 3, 1991, abandoned, which is a continuation-in-part of Ser. No. 491,490, Mar. 9, 1990, abandoned.

[30] Foreign Application Priority Data

Mar. 11, 1989 [JP] Japan .................. 1-58735
Feb. 14, 1990 [JP] Japan .................. 2-34893

[51] Int. Cl.$^5$ .............. A61K 33/38; A61K 33/00; A61K 31/695; A01N 59/16
[52] U.S. Cl. .................. 424/618; 424/724; 514/63; 514/495; 504/120; 504/151; 504/116
[58] Field of Search .............. 514/63, 495; 424/618, 424/724; 71/67

[56] References Cited

U.S. PATENT DOCUMENTS

| | | | |
|---|---|---|---|
| 1,920,492 | 8/1933 | Zellmann | 424/16 |
| 2,066,271 | 12/1936 | Irwin | 424/16 |
| 2,179,806 | 11/1939 | Wegst et al. | 423/332 |
| 2,640,756 | 6/1953 | Wills et al. | 424/724 |
| 3,702,298 | 11/1972 | Zsoldas et al. | 210/62 |
| 3,755,183 | 8/1973 | Fahn et al. | 252/194 |
| 3,835,216 | 9/1974 | Almagro et al. | 423/332 |
| 4,092,245 | 5/1978 | Franks | 210/64 |
| 4,608,247 | 8/1986 | Heinig, Jr. | 424/16 |
| 4,770,866 | 9/1988 | Christophliemk et al. | 423/334 |
| 4,911,898 | 3/1990 | Hagiwara | 423/118 |
| 4,931,078 | 6/1990 | Yamamoto | 71/67 |

Primary Examiner—Marianne M. Cintins
Assistant Examiner—T. J. Criares
Attorney, Agent, or Firm—Koda and Androlia

[57] ABSTRACT

A water-soluble glass treating agent consisting essentially of, by weight: 55 to 80% of $SiO_2$, 19.5 to 42% of $Na_2O$ and 0.5 to 3% of $Ag_2O$ (conversion for $AgNO_3$) is disclosed. Also disclosed is a water-soluble glass treating agent further containing, by weight: 0.5 to 30% of $Al_2O_3$ in the above compositions. These glass water treating agents are glass free from boron constituent but which functions to kill or suppress bacteria and microorganisms and are low in cost because it is simple in the composition of glass which is composed principally of three constituents at max. That agent which contains $Al_2O_3$ functions to increase concentration of Ag in glass and to decrease the deliquescent property of glass.

4 Claims, No Drawings

WATER-SOLUBLE GLASS WATER-TREATING AGENT

This is a continuation-in-part of application Ser. No. 725,902, filed Jul. 3, 1991 now abandoned, which is a continuation-in-part of application Ser. No. 491,490 filed Mar. 9, 1990, now abandoned.

BACKGROUND OF THE INVENTION

1. Field of the Invention

This invention relates to a water-soluble glass water-treating agent of boron-free from its glass composition, and more particularly to a water-treating agent composed of water-soluble glass containing monovalent silver ion effective for the prevention of water putrefaction, formation of slime and growth of algae in water.

2. Prior Art

It was proposed by a Japanese Patent Publication Laid-open No. 210098/1987 to prevent the putrefaction, formation of slime, and growth of algae by removing bacteria and microorganisms from water by treating the water with water-soluble glass composition containing monovalent therein. The present inventors previously proposed in Japanese Patent Application Ser. No. 183055/1986 (Laid-open No. 39692/1988) and U.S. Patent Application Ser. No. 07/311,105 an effective art of wrapping a water-soluble glass water-treating agent in a water-permeable fiber cloth or synthetic resin sheet and steeping the same in water to make $Ag+$ ion flow out positively and gradually in the water while preventing the glass from becoming difficult of dissolution in the water.

As the composition of the water-soluble glass of the type described above, it is general practice to use one or two kinds of $SiO_2$, and $B_2O_3$ and $P_2O_5$ as mesh-forming oxides in combination with one or more than two kinds of $Na_2O$, $K_2O$, $CaO$, $MgO$, $BaO$ and $ZnO$ in the form of mesh-modifying oxides.

But in recent times, some people are anxious about the effects of the water supply system inclusive of drinking water upon the human body (accumulation of boron in the human body when drunk), and the appearance of water-soluble glass free of boron is desired. On the other hand, when the art of making the water-soluble glass is considered in connection with the art of causing the $Ag+$ ion which is an effective constituent of the glass to flow out positively in the water, more inference cannot be drawn but extensive experiments and studies are necessary for selecting a combination of a mesh-forming oxide with a mesh-modifying oxide and for establishment of the composition range of oxides in bringing water solubility into compatibility with glass formability. The reason is that the phenomenon of the $Ag+$ ion flowing out of the glass in the water is not theoretically sufficiently elucidated.

SUMMARY OF THE INVENTION

In an attempt to obviate the disadvantages inherent in the prior art, this invention is intended to provide a water-treating agent consisting of boron-free water-soluble glass composition based on numerous systematic experiments and on a combination of and a composition range of mesh-forming oxide and mesh-modifying oxide. From the composition having a boron-free property, it is readily inferred that the water-treating agent of the invention can positively be used in the city water system containing drinking water.

DETAILED DESCRIPTION OF THE INVENTION

The invention relates to a water-soluble glass water treating agent consisting essentially of, by weight: 55 to 80% of $SiO_2$, 19.5 to 42% of $Na_2O$ and 0.5 to 3% of $Ag_2O$ (conversion for $AgNO_3$). The invention relates also to a water-soluble glass water-treating agent further containing 0.5 to 30% of $Al_2O_3$ in the composition thereof. The preferred composition of the water-soluble glass water treatment agent is, by weight: 57 to 72% of $SiO_2$, 19.6 to 35% of $Na_2O$ and 1.0 to 2.0% of $Ag_2O$. Still further, the preferred range of $Al_2O_3$ is 3.0 to 19.6% by weight.

$SiO_2$ is a mesh-forming oxide and serves to carry $Ag+$ ion from $Ag_2O$ into the water by the structure of oxide making it possible for the oxide to dissolve itself into the water having the mesh structural unit therein, namely silver is not singly dissolved from the $Ag_2O$ to flow out in the water but is dissolved in the water together with the mesh unit of $SiO_2$, and accordingly it is presumed that the original function of $Ag+$ ion of killing or suppressing bacteria and microorganisms is incessantly ensured by the $SiO_2$ flowing out in the water. But since $Si(OH)_4$ produced by hydrolysis functions as an acid, it serves to modify pH in connection with the reaction equivalent of NaOH which will hereinafter bedescribed. But when $SiO_2$ is less than 55% in content, the glass becomes easy of dissolution, lacks in continuous mesh-unit structure and is made into $SiO_2$ of too small an unit to become suitable for dissolution of silver, and at the same time $Na_2O$ increases in content and the water tends to be alkaline. Excess of 80% of $SiO_2$ reduces the water solubility of glass, with the result that it takes longer time for the glass to flow out in the water and also superhigh-temperature heating becomes essential for the production of glass. From the fact mentioned above, it is desirable to set $SiO_2$ content of glass in the range of 55 to 80%.

On the other hand, $Na_2O$ is a mesh-modifying oxide and functions to take $Ag_2O$ into glass and ensures the water solubility of glass. The reason for this is thought to lie in cutting off the continuous mesh structure of $SiO_2$, and when $Na_2O$ is increased in amount, water-solubility is enhanced, with the result that even solid glass takes on a deliquescent property and becomes unfit for preservation and that when the glass comes to contain 50% and more of $Na_2O$, it becomes clear that vitrification is impossible. Also, the NaOH produced by hydrolysis is high in alkali, and accordingly increases pH in water and the water containing the NaOH produced by hydrolysis is unfit especially for the treatment of drinking water whole high alkalinity is prohibited. For reference, because tolerance of pH for drinking water is 5.8 to 8.6, the use of a large amount of $Na_2O$ must be prohibited in this sense. Conversely, when the amount of $Na_2O$ is small, it becomes impossible for the glass to take in a large amount of $Ag_2O$. From this viewpoint, it is considered desirable that $Na_2O$ content in water be in the range of 19.5 to 42%. $Ag_2O$ is a principal part of the water-soluble glass for germicidal effect, and is thought to be taken as $Ag_2O$ into the $SiO_2$ based glass by the action of $Na_2O$ as mentioned above and to flow out in the water in the form of $Ag+$ ion together with the mesh unit of $SiO_2$. but when $Na_2O$ is less than 0.5% in content, the intended effects of killing or suppressing bacteria and microorganisms by $Ag+$ ion cannot be expected but conversely when it exceeds 3%, it becomes difficult for the Na₂O to dissolve itself into glass and is made unsuitalbe for glass manufacturing. Such being the fact, Ag₂O is set in the range of 0.5 to 3%. The wate-treating agent of the invention having the above range of composition kills bacteria and prevents the formation of slime and growth of algae by the action of Ag+ ion which flows out in the water by steeping the agent in the water as it is left intact or by wrapping up the agent in water-permeable fiber cloth or a water-permeable synthetic resin sheet and steeping the wrapped agent in the water as disclosed in Japanese Patent Application No. 183055/1986, and particularly the application of the agent to a service water system inclusive of drinking water is significant because the agent is free from boron. It is significant in that the agent is fit for a city water system inclusive of drinking water. The effect of treatment brought about by the use of the treating agent according to the invention, as apparent from the examples to be later described, is demonstrated in that the growth of colon bacilli could be prevented even by the lapse of as many as more than 80 days, for example, by slowly and continuously pouring city water into the water tank. Incidentally, AgNO₃ is usually used as a raw material for Ag₂O, but is calculatedin conversion of Ag₂O in the glass composition.

To take a larger amount of Ag₂O into the glass mesh structure of the water-soluble glass of the invention, the amount of Na₂O should be increased, but the increased amount of Na₂O provides the glass with a deliquescent property to thereby render it not only difficult for the glass to keep itself in shape but also to produce NaOH in large amounts to thereby reduce the alkali content of glass composition and to disadvantageously provide high alkalinity. This fact was previously described, and the researches and experiments conducted thereafter has made it clear that the use of Al₂O₃ serves to render it possible for Ag₂O to take a large amount of Ag₂O into the mesh structure of glass and to moderate the deliquescence of glass. Namely, Al₂O₃ is reduced from 6 to 4 in coordination number with respect to oxygen by the presence of Na₂O and Ag₂O to facilitate formation of mesh structure, and in this connection, an Ag atom is bonded with ah Al atom to increase the concentration of Ag in the glass mesh unit to thereby improve the action of killing or suppression bacteria and microorganisms by Ag+ ion, but because Al₂O₃ itself is a high melting-point material, the use of too much Al₂O₃ raises the melting point of a glass material to make vitrification difficult and reduce water solubility of glass. Experiments show that the Al₂O₃ content in the range of 0.5 to 30% is proper. An amount less than 5% of Al₂O₃ content barely produce any tangible effect, but on the contrary, more than 30% poses the problems described above. Al₂O₃ in the specified range thus may be said to be an effective glass constituent for not only increasing the concentration of Ag in the glass mesh structure but also moderating the deliquescent property of glass. Substitution of part of Na₂O by K₂O and/or CaO makes it possible that the substitution serves to increase the concentration of Ag in glass in a slightly greater degree than when Na₂O is used as a single alkali constituent.

As CaO can be a source of supply of Ca ion necessary for the health of human body, the use of CaO is increased in significance. When Al₂O₃ is used, the solubility of glass is more or less reduced, but as Ag is increased, in concentration, the total effect of killing or suppressing bacteria and microorganisms by Ag+ ion is no less great.

EXAMPLE 1

I) Water-soluble glass water-treating agent: 72% of SiO₂, 27% of Na₂O, and 1% of Ag₂O (conversion of AgNO₃).

II) Test:

The faucet of city water was connected to one side of a water tank with a capacity of 60 l, and an inflow rate of city water was set at 0.1 l/min. and was incessantly let into the tank, while on the other hand, a drain pipe was connected to the other side of the tank to drain continuously but in a manner to keep the tank always full of water. 60 g of the water treating agent was wrapped up in a synthetic resin nonwoven cloth to form a bag of the agent and the bag was steeped in the tank to check up on the test items in the following table. In the tank were also steeped five nails and five clips to check the same for a state of corrosion. The results are shown in Table 1.

TABLE 1

| Date | Growth of algae | Turbidity | Number of general bacteria | Colon Bacilli |
|---|---|---|---|---|
| 1988. | | | | |
| 5.10 | ⓒ | ⓒ | 30 & less/ml | not detected |
| 15.10 | ⓒ | ⓒ | " | " |
| 25.10 | ⓒ | ⓒ | " | " |
| 5.11 | ⓒ | ⓒ | " | " |
| 15.11 | ⓒ | ⓒ | " | " |
| 25.11 | ⓒ | ⓒ | " | " |
| 5.12 | ⓒ | ⓒ | " | " |
| 15.12 | ⓒ | ⓒ | " | " |
| 25.12 | ⓒ | ⓒ | " | " |

Remarks
(i) A simple test on corrosion behavior shows that the nails and clips were kept throughout the test in the same manner as they were before steeping.
(ii) Symbol ⓒ in the table shows that there was no change effected in the growth of algae and turbidity.

As apparent from Table 1, the use of the water-treating agent of the invention showed no production of colon bacilli even after a lapse of more than 80 days. During the period no change was noticed in respect with algae growth and turbidity. The hygienic effect brought about by the test can equally be expected from the swimming pool using city water.

EXAMPLES 2-7

The range of composition and observations on vitrification are shown in Table 2.

| Expl. | Composition (% by weight) | | | | Observation on Vitrification |
|---|---|---|---|---|---|
| | SiO₂ | Na₂O | Al₂O₃ | Ag₂O | |
| 2 | 58.8 | 19.6 | 19.6 | 2.0 | Very high in melting point but was possible of melting |
| 3 | 63.7 | 29.4 | 4.9 | 2.0 | Lower in melting point than Example 2 |
| 4 | 60.0 | 35.0 | 3.0 | 2.0 | Much lower in melting point and showed better meltability |
| 5 | 58.8 | 34.3 | 4.9 | 2.0 | Almost the same in Example 4 |
| 6 | 58.8 | 29.4 | 9.8 | 2.0 | Slightly higher in melting point than Examples 4 and 5 |
| 7 | 57.0 | 33.0 | 8.0 | 2.0 | Slightly lower in melting point than Example 6 |

At Pages 204-210 of *A General Introduction Of Inorganic High-Molecular Substances* by Kajiwara Naruyuki which was published by Chizein Shoin in 1978 is generally described as water-soluble glass and the method of making water soluble glass and an example of how to make water-soluble glass is as follows:

Example 4 for obtaining approx. 100 kg of the water-soluble glass consisting essentially of, by weight, 60% of $SiO_2$, 35% of $Na_2O$, 1.36% of $Ag_2O$ (conversion of $AGNO_3$), and 3% of $A_2O_3$.

Step 1—Preparing each glass raw materials and mixing them by the amount below:

| (composition) | (Raw Materials) |
|---|---|
| for 60% of $SiO_2$ | 64.9 kg of Silica Sand is used wherein 64.9 kg × 0.925* ≈ 60 kg $SiO_2$ is contained with 64.9 kg × 0.04* ≈ 2.6 kg alumina . . . a) |
| for 3% of $A_2O_3$ | 0.6 kg of Al $(OH)_3$ is used wherein 0.6 kg × 0.654* ≈ 0.4 kg alumina . . . b) is contained whereupon all the alumina contents are a) + b) ≈ 3 kg |
| for 35% of $Na_2O$ | 2 kg of $NaNO_3$ is used wherein 2 kg × 0.33* ≈ 0.66 kg $Na_2O$ . . . c) is contained, and 58.7 kg of $Na_2CO_3$ is used wherein 58.7 kg × 0.585* ≈ 34.34 kg $Na_2O$ . . . d) is also contained. All the $Na_2O$ contents are c) + d) = 35 kg |
| for 1.36% of $Ag_2O$ (conversion for $AgNO_3$) 2 kg of $AgNO_3$ is used wherein 2 kg of 0.68* ≈ 1.36 kg $Ag_2O$ is contained. | |

Note: * = Coefficient. and $$\text{Coefficient} = \frac{\text{Molecular weith of a metal oxide (constituting a glass) in a raw glass material}}{\text{Total molecular weight of the raw material}}$$

Step 2—Stirring the above mixed materials (note that $AgNO_3$ be powdered), putting them into a crucible and heating them to melt at a temperature of 1000°-1400° C. for 18 hours.

Step 3—Pouring the resulting molten material into a water-cooled stainless plate for rapidly cooling the same to solidify.

In a similar manner to the above-described method of making the water-soluble glass of Example 4 of Table 2, the other Examples 2, 3 and 5-7 can be made utilizing the various percentages by weight of each of the compositions. In addition, for water-soluble glass which does not contain $Al_2O_3$, silica sand of high purity (99%) is utilized. Also, for water-soluble glass containing CaO, $Ca(OH)_2$ is utilized, while for glass containing $K_2O$, $K_2CO_3$ is utilized.

In Table 2, although the addition of $Al_2O_3$ showed the tendency of the melting point being higher than the absence of $Al_2O_3$, the specified range of use of $Al_2O_3$ enabled melting and vitrification.

In Table 2, although the addition of $Al_2O_3$ showed the tendency of the melting point being higher than the absence of $Al_2O_3$, the specified range of use of $Al_2O_3$ enabled melting and vitrification.

Out of the Examples 2-7 shown above, the results of a water quality examination made in the following procedure by the use of the water treating agent of Example 4 are shown in Table 3 and 4.

TEST 1

After 250 ml of city water was poured into a trigonal flask with a capacity of 300 ml, 2 g of water treating agent lump (800 ppm) in Example 4 was wrapped up in synthetic fiber nonwoven cloth to form a bag containing the agent lump and the flask was placed in the sun. Change in slack water was observed.

Incidentally, five clips were also steeped in the five trigonal flasks to observe how they were corroded. This simple test is thought to be fit for storage of drinking water in such a place, where there is provided no city water distribution facility, as in an isolated island where city water is irregularly stored, rainwater is used or storage of underground water is utilized.

TABLE 3

| | Item | | | | |
|---|---|---|---|---|---|
| Date | Growth of algae | Slime on wall surface | Number of general bacteria | Group of colon bacilli | Corrosion behavior |
| 1989 | | | | | |
| 18.10 | ⊚ | ⊚ | 30 and less/ml | Not detected | ⊚ |
| 25.10 | ⊚ | ⊚ | 30 and less/ml | Not detected | ⊚ |
| 1.11 | ⊚ | ⊚ | 30 and less/ml | Not detected | ⊚ |
| 8.11 | ⊚ | ⊚ | 30 and less/ml | Not detected | ⊚ |
| 15.11 | ⊚ | ⊚ | 30 and less/ml | Not detected | ⊚ |
| 22.11 | ⊚ | ⊚ | 30 and less/ml | Not detected | ⊚ |
| 29.11 | ⊚ | ⊚ | 30 and less/ml | Not detected | ⊚ |
| 6.12 | ⊚ | ⊚ | 30 and less/ml | Not detected | ⊚ |
| 13.12 | ⊚ | ⊚ | 30 and less/ml | Not detected | ⊚ |
| 20.12 | ⊚ | ⊚ | 30 and less/ml | Not detected | ⊚ |
| 27.12 | ⊚ | ⊚ | 30 and less/ml | Not detected | ⊚ |
| 1990 | | | | | |
| 10.1 | ⊚ | ⊚ | 30 and less/ml | Not detected | ⊚ |
| 17.1 | ⊚ | ⊚ | 30 and less/ml | Not detected | ⊚ |
| 24.1 | ⊚ | ⊚ | 30 and less/ml | Not detected | ⊚ |
| 31.1 | ⊚ | ⊚ | 30 and less/ml | Not detected | ⊚ |

Remarks:
1. In Talbe, 3, items "Growth of algae", "Slime on wall surface", "Corrosion behavior", symbol ⊚ indicates that no change is made in the specified items.
2. Stored water was kept clean during testing (result of observation).

It is apparent from Table 3 that the water treating agent in Example 4 was effective for killing or suppressing bacteria and microorganisms as that in Table 1.

TEST II

The germicidal agents used in swimming pools are restricted to chlorine-based germicides under the stipulation prescribed in Japan. Sodium hypochlorite is often used in combination with cohesive precipitant PAC (polyaluminum chlorite).

In recent years, harmful effects of the chloride used in killing bacteria in pools have come to be an issue in various respects. As a link in the chain of improvement, an attempt has been made to kill bacteria by the use of monovalent silver ion of the invention.

With respect to a hot swimming pool (25 m × 13 m × 1.1 m − 1.2 m) having a total water capacity of 375 m³, part of the water was collected after closing of business, and thereafter 10 kg (27 ppm) of powdered water-treating agent of the invention was scattered. Next day before opening of business, water was collected from the pool and thereafter further 3 kgs (8 ppm) of water-treating agent was scattered. The water collected was checked for quality in accordance with the water quality test items for drinking water.

TABLE 4

| Item | Testing date 1989 | | | |
|---|---|---|---|---|
| | 4 April Ended 9 p.m. | 5 April Started 9 a.m. | 5 April Ended 9 a.m. | 6 April Started 9 a.m. |
| Nitrate nitrogen & nitrite nitrogen mg/l | 2.6 | 2.7 | 2.5 | 2.5 |
| Chlorine ion mg/l | 59 | 58 | 53 | 50 |
| Potassium permanganate consumed mg/l | 3.8 | 4.3 | 3.6 | 4.0 |
| Number of general bacterial No./ml | 16 | 20 | 17 | 0 |
| Colon bacilli | 0 | 0 | 0 | 0 |
| pH | 7.2 | 8.0 | 7.8 | 7.8 |
| Offensive odor | Nothing particularly unusual | Nothing particularly unusual | Nothing particularly unusual | Nothing particularly unusual |
| Taste | Nothing particularly unusual | Nothing particularly unusual | Nothing particularly unusual | Nothing particularly unusual |
| Turbidity deg. | 1 | 1 | 1 | 1 |

TABLE 4-continued

| Item | Testing date 1989 | | | |
|---|---|---|---|---|
| | 4 April Ended 9 p.m. | 5 April Started 9 a.m. | 5 April Ended 9 a.m. | 6 April Started 9 a.m. |
| Chromatility deg. | 1 | less 1 | less 1 | less 1 |

Remarks observed: The results of water quality test were all in the range that comes up to the drinking water standard.

As apparent from the description so far given, the water-treating agent of the invention provides the advantageous effect that it is glass free from boron but which functions to kill or suppress bacteria and microorganisms; in spite of this fact, because the glass is simple in the structure of glass composed principally of three constituents, it is low in cost; by setting $SiO_2$—$Na_2O$—$Ag_2O$ in the desired range of composition, the glass keeps balance between vitrification, water solubility and pH value; and that is renders it possible to ensure incessant function to the water-treating agent of the invention because $SiO_2$ mesh unit which carries $Ag+$ ion into the water is adequately held. Further, the invention provides the advantages that the concentration of Ag in the glass is increased and also the deliquescent property of glass is moderated by the use of $Al_2O_3$.

I claim:

1. A boron-free water-soluble glass for treating water consisting essentially of, by weight: 57 to 72% of $SiO_2$, 19.5 to 35% of $Na_2O$ and 1.0 to 2.0% of $Ag_2O$.

2. A water-soluble glass for treating water according to claim 1, wherein said water-soluble glass consists essentially of, by weight: 72% of $SiO_2$, 27% of $Na_2O$ and 1% of $Ag_2O$.

3. A boron-free water-soluble glass for treating water consisting essentially of, by weight: 57 to 72% of $SiO_2$, 19.5 to 35% of $Na_2O$, 1.0 to 2.0% of $Ag_2O$ and 3 to 19.6% of $Al_2O_3$.

4. A water-soluble glass for treating water according to claim 3, wherein said water-soluble glass consists essentially of, by weight: 60% of $SiO_2$, 35% of $Na_2O$, 1.36% of $Ag_2O$, and 3% of $Al_2O_3$.

* * * * *